(12) United States Patent
Iwakiri

(10) Patent No.: US 10,205,176 B2
(45) Date of Patent: Feb. 12, 2019

(54) CELL MODULE FOR SOLID OXIDE FUEL CELL, AND SOLID OXIDE FUEL CELL USING SAME

(71) Applicant: NISSAN MOTOR CO., LTD., Yokohama-shi, Kanagawa (JP)

(72) Inventor: Yasunori Iwakiri, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 15/575,513

(22) PCT Filed: May 21, 2015

(86) PCT No.: PCT/JP2015/064553
§ 371 (c)(1),
(2) Date: Nov. 20, 2017

(87) PCT Pub. No.: WO2016/185594
PCT Pub. Date: Nov. 24, 2016

(65) Prior Publication Data
US 2018/0159146 A1 Jun. 7, 2018

(51) Int. Cl.
*H01M 8/0202* (2016.01)
*H01M 8/1213* (2016.01)
(Continued)

(52) U.S. Cl.
CPC ........ *H01M 8/0202* (2013.01); *H01M 8/02* (2013.01); *H01M 8/0258* (2013.01); *H01M 8/12* (2013.01);
(Continued)

(58) Field of Classification Search
CPC .... H01M 8/0202; H01M 8/12; H01M 8/1213; H01M 8/1226
See application file for complete search history.

(56) References Cited

U.S. PATENT DOCUMENTS 4,269,642 A * 5/1981 DeCasperis .......... H01M 4/861
156/298
5,336,569 A 8/1994 Misawa et al.
(Continued)

FOREIGN PATENT DOCUMENTS

JP 2008-135272 6/2008
JP 2011-17055 A 1/2011
(Continued)

OTHER PUBLICATIONS

Kevin Lai et al., A Quasi-Two-Dimensional Electrochemistry Modeling Tool for Planar Solid Oxide Fuel Cell Stacks, Journal of Power Sources, 196, 2011, pp. 3204-3222, available on-line Nov. 26, 2010.

*Primary Examiner* — Jonathan G Jelsma
(74) *Attorney, Agent, or Firm* — Foley & Lardner LLP

(57) ABSTRACT

A cell module for a solid oxide fuel cell includes a cell substrate (1) having gas permeability, one electrode (2) among a fuel electrode and an air electrode formed on the cell substrate, a solid electrolyte (3) formed on the one electrode, and the other electrode (4) formed on the solid electrolyte, wherein in the case of counter-flow of the fuel gas and the oxidant gas flow, the gas permeability of a central portion (1b) of the cell substrate in the gas flow direction is lower than the gas permeability of an inlet portion (1a) and an outlet portion (1c) of the cell substrate.

13 Claims, 12 Drawing Sheets

(51) Int. Cl.
  *H01M 8/1226* (2016.01)
  *H01M 8/12* (2016.01)
  *H01M 8/02* (2016.01)
  *H01M 8/0258* (2016.01)
  H01M 8/0232 (2016.01)
  H01M 8/124 (2016.01)
(52) U.S. Cl.
  CPC ....... *H01M 8/1213* (2013.01); *H01M 8/1226* (2013.01); *H01M 8/0232* (2013.01); *H01M 2008/1293* (2013.01)

(56) References Cited

U.S. PATENT DOCUMENTS

| | | | |
|---|---|---|---|
| 2004/0253504 | A1 | 12/2004 | Mossman et al. |
| 2007/0298299 | A1 | 12/2007 | Izawa et al. |
| 2010/0062317 | A1 | 3/2010 | Selcuk |
| 2016/0329587 | A1* | 11/2016 | Ohrn .................. H01M 8/1246 |

FOREIGN PATENT DOCUMENTS

| | | | |
|---|---|---|---|
| JP | 2012-94427 A | 5/2012 | |
| JP | 5364477 B2 | 12/2013 | |
| WO | WO 2015/045682 A1 | 4/2015 | |

* cited by examiner (a)

(b)

CELL MODULE FOR SOLID OXIDE FUEL CELL, AND SOLID OXIDE FUEL CELL USING SAME

TECHNICAL FIELD

The present invention relates to a cell module for a solid oxide fuel cell, and a solid oxide fuel cell using the same. More specifically, the present invention relates to a cell module for a solid oxide fuel cell in which excessive increases in temperature are suppressed, and a solid oxide fuel cell using the cell module.

BACKGROUND ART

In recent years, the heightened awareness of global environmental problems has resulted in considerable investigation of the application of various types of fuel cells to automobiles. Among the various types of fuel cells, solid oxide fuel cells (SOFC) exhibit high efficiency, and are the focus of much attention as potential vehicle power sources.

Solid oxide fuel cells (SOFC) use a solid oxide material with oxygen ion conductivity such as a stabilized zirconia or ceria-based solid solution as the electrolyte. Moreover, an air electrode and a fuel electrode that exhibit gas permeability are stacked on the opposing surfaces of the solid electrolyte to form a unit cell. Using the gas-impermeable solid electrolyte as a partition, a fuel gas such as hydrogen or a hydrocarbon is supplied to the fuel electrode side from externally, and an oxidant gas such as air is supplied to the air electrode side, thereby generating electricity. Besides hydrogen and hydrocarbons, reformed gases obtained by reforming all manner of liquid fuels are sometimes also used as the fuel gas.

In those cases where a solid oxide fuel cell is used in an automobile or the like, the peculiarities of the usage environment mean that the solid oxide fuel cell sometimes requires a simultaneous combination of high-output operation and high durability. For example, Patent Document 1 discloses an electrochemical cell that includes a solid electrolyte layer, a first porous electrode layer, a second porous electrode layer, and a conductive porous support for supporting these layers, wherein gas flow channels are provided through which a gas flows when the surface of the conductive porous support contacts the gas. The conductive porous support has portions of differing porosity, and those portions of differing porosity are configured so that the porosity is low at the upstream side of the gas flow channels in the gas flow direction, and high at the downstream side. By employing this type of configuration, in which the porosity is low at the upstream side of the gas flow channels and high at the downstream side, the performance and efficiency of the electrochemical cell can be enhanced.

PRIOR ART DOCUMENTS

Patent Documents

Patent Document 1: JP 5364477 B

SUMMARY OF INVENTION

Problems Invention Aims to Solve

In solid oxide fuel cells, a temperature distribution occurs in the unit cell during power generation. Specifically, in the case of co-flow, when the fuel gas and the oxidant gas flow in the same direction within the plane of the unit cell, the temperature of the unit cell is at its highest at the outlets for the fuel gas and the oxidant gas. Accordingly, if the porosity is increased at the downstream side of the unit cell as described in Patent Document 1, then because the porosity is raised and power generation is increased at the downstream portion where the unit cell temperature is already higher, the temperature of the unit cell tends to increase excessively. As a result, there is a possibility that the operation limit temperature, which is determined on the basis of the properties of the cell materials, may be exceeded, resulting in damage to the unit cell and a deterioration in the durability.

The present invention has been developed in light of these issues associated with the conventional technology. Objects of the present invention are to provide a cell module for a solid oxide fuel cell in which the operation limit temperature is unlikely to be exceeded and any deterioration in durability can be suppressed, and also to provide a solid oxide fuel cell that uses this cell module.

Means for Solution of the Problems

In order to achieve the above objects, a cell module for a solid oxide fuel cell according to an aspect of the present invention has a cell substrate having gas permeability, and a fuel electrode, a solid electrolyte and an air electrode formed on the cell substrate. Then, in the case of counter-flow of the fuel gas and the oxidant gas, the gas permeability of the central portion of the cell substrate is lower than the gas permeability of the inlet portion and the outlet portion. Further, in the case of co-flow of the fuel gas and the oxidant gas flow, the gas permeability of the outlet portion of the cell substrate is lower than the gas permeability of the portions other than the outlet portion.

Effects of the Invention

By using the cell module for a solid oxide fuel cell according to the present invention, the amount of power generation decreases for the unit cell opposing the portion of the cell substrate having reduced gas permeability. As a result, the maximum temperature of the cell module can be lowered, and any deterioration in the durability of the cell module can be suppressed.

EMBODIMENTS FOR CARRYING OUT THE INVENTION

Figure 1:
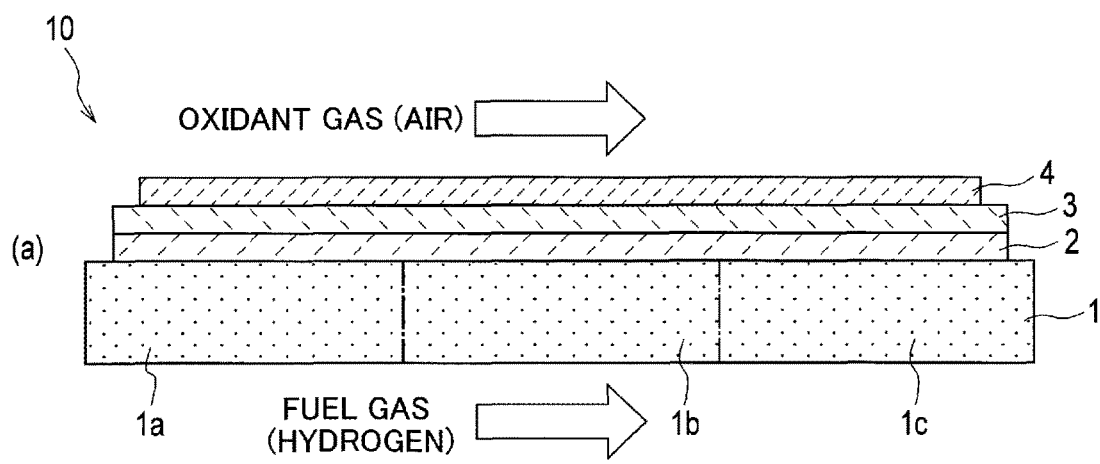
FIG. 1 is a set of schematic cross-sectional views illustrating a cell module for a solid oxide fuel cell. (a) illustrates the case of co-flow of the fuel gas and the oxidant gas flow, and (b) illustrates the case of counter-flow of the fuel gas and the oxidant gas.
Figure 1:
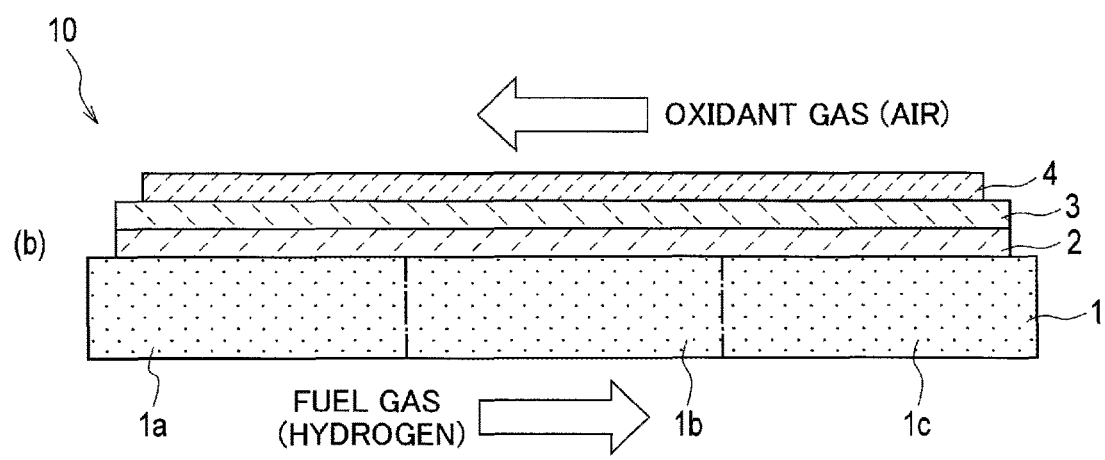

Cell modules for solid oxide fuel cells according to embodiments of the present invention, and solid oxide fuel cells using those cell modules, are described below in further detail. The dimensional ratios in the drawings have been exaggerated in some cases to facilitate the description, and may differ from the actual ratios.

[First Embodiment]

As illustrated in FIG. 1, a cell module 10 according to this embodiment has a cell substrate 1 having gas permeability. The cell module 10 also has an electrode 2 that is one of a fuel electrode and an air electrode formed on top of the cell substrate 1, a solid electrolyte 3 formed on top of the electrode 2, and the other electrode 4 formed on top of the solid electrolyte 3.

Figure 2:
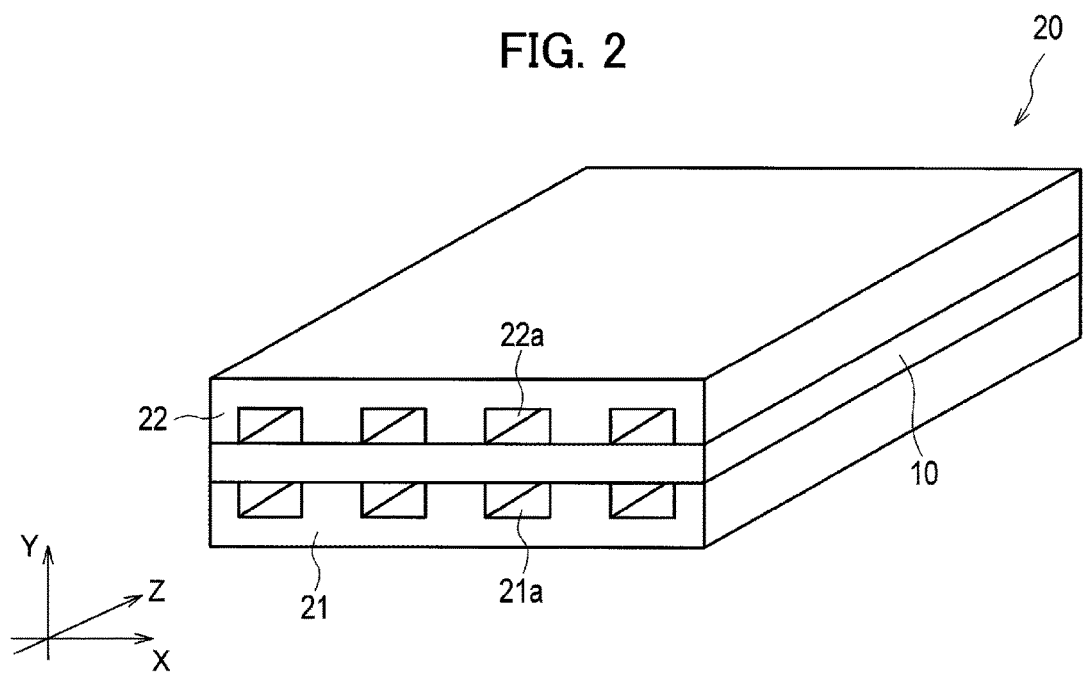
FIG. 2 is a perspective view illustrating a solid oxide fuel cell.

Moreover, as illustrated in FIG. 2, in a solid oxide fuel cell 20 of this embodiment, the cell module 10 is sandwiched between a fuel electrode interconnector 21 (fuel electrode separator), and an air electrode interconnector 22 (air electrode separator). The fuel electrode interconnector 21 includes a plurality of fuel gas channels 21a, and the air electrode interconnector 22 includes a plurality of oxidant gas channels 22a. The fuel gas channels 21a and the oxidant gas channels 22a form a plurality of linear channels that are arranged parallel to each other (parallel channels).

The cross-sectional shapes of the channels (the fuel gas channels 21a and the oxidant gas channels 22a) provided in the fuel electrode interconnector 21 and the air electrode interconnector 22 are composed of protrusions known as ribs, and recesses known as channels. Of these components, the ribs of one of the fuel electrode interconnector 21 and the air electrode interconnector 22 contact the cell substrate 1, thus enabling the conduction of electrons between the interconnector and the cell substrate 1. Further, the ribs of the other of the fuel electrode interconnector 21 and the air electrode interconnector 22 contact the other electrode 4, thus enabling the conduction of electrons between the interconnector and the other electrode 4.

The fuel gas that flows through the fuel gas channels 21a and the oxidant gas that flows through the oxidant gas channels 22a may flow in opposite directions within the plane of the cell module 10 (counter-flow). Further, the fuel gas and the oxidant gas may flow in the same direction within the plane of the cell module 10 (co-flow).

In the following description, for the sake of convenience, the cell module 10 according to the present embodiment is described with the assumption that the first electrode 2 is the fuel electrode, and the other electrode 4 is the air electrode. In this case, the fuel electrode interconnector 21 contacts the cell substrate 1, and the air electrode interconnector 22 contacts the air electrode.

Figure 3:
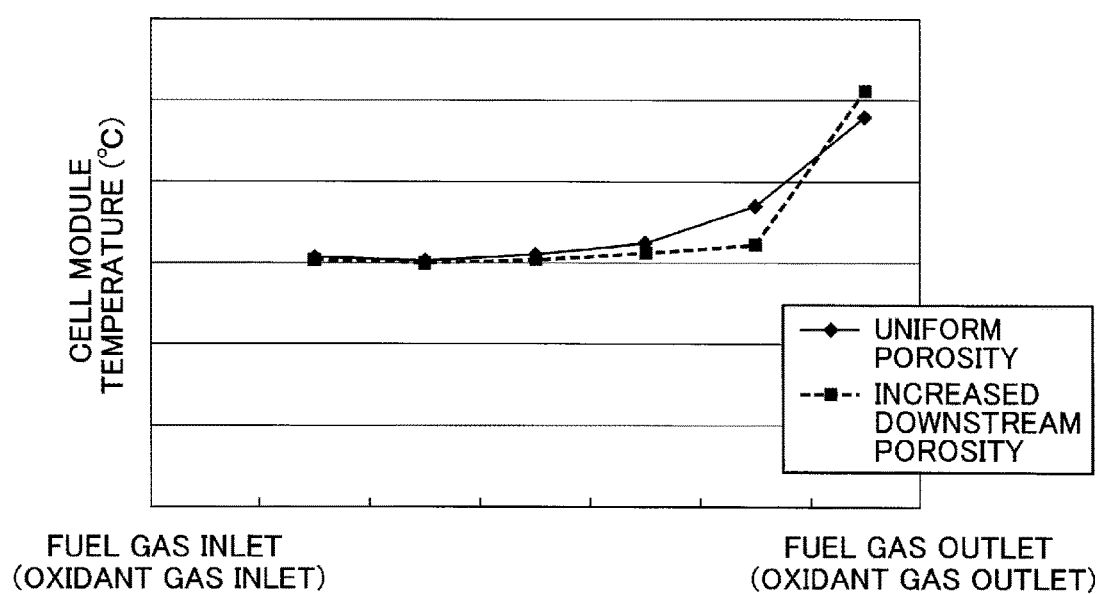
FIG. 3 is a graph illustrating the relationship between the position along the gas flow direction in the cell module and the temperature of the cell module.

In the case of a co-flow structure such as that illustrated in FIG. 1(a), where the fuel gas and the oxidant gas flow in the same direction within the plane of the cell module 10, the cell module temperature is highest at the outlet portions 1c for the fuel gas and the oxidant gas, as illustrated in FIG. 3. In other words, in the case of a co-flow structure, the heat generated due to heat production from the cell reaction and Joule heating is transmitted to the downstream side by a convective heat transfer effect produced by the working fluids. As a result, the temperature of the cell module increases from the inlets toward the outlets of the gas channels.

This type of phenomenon is similar both in the case where the porosity of the cell substrate 1 is uniform across the entire surface, and the case where the porosity is increased at the fuel gas and oxidant gas outlet portions as described in Patent Document 1. This fact is clear from both experimental data and from the literature, and a number of reports exist in the literature. For example, K. Lai, B. J. Koeppel, K. S. Choi, et al., "A quasi-two-dimensional electrochemistry modeling tool for planar solid oxide fuel cell stacks", Journal of Power Sources, vol. 196, no. 6, pp. 3204 to 3222, 2011 discloses a comparison of temperature distribution experimental data and simulation results. In particular, if the porosity of the cell substrate is increased at the gas downstream side as described in Patent Document 1, thereby facilitating penetration of the fuel gas into the power generation surface of the fuel electrode 2, then the amount of power generated at the fuel gas outlet portion 1c increases compared with that at the inlet portion 1a. As a result, compared with the case where the porosity of the cell substrate 1 is uniform, the cell module temperature at the outlet portion 1c is more likely to increase in an intensive manner.

In contrast, in the case of a counter-flow structure such as that illustrated in FIG. 1(b), where the fuel gas and the oxidant gas flow in opposite directions within the plane of the cell module 10, a different temperature distribution to that of the co-flow structure is obtained. Specifically, in the case of counter-flow, rather than the inlet portions 1a and outlet portions 1c of the fuel gas and the oxidant gas in the cell module 10, a portion of higher cell module temperature develops in the central portion 1b. This is because in the case of counter-flow, the outlet side of the oxidant gas is the inlet side for the fuel gas, meaning a low-temperature fuel gas is introduced at the outlet side of the oxidant gas. As a result, the cell module temperature is more likely to increase in an intensive manner in the central portion 1b rather than the outlet portion 1c or the inlet portion 1a.

In this manner, regardless of whether the fuel gas and the oxidant gas are in a co-flow or counter-flow arrangement, the temperature of the cell module 10 increases in a localized portion, and there is possibility that the temperature may exceed the operation limit temperature, leading to a deterioration in the durability. Accordingly, in the present embodiment, in order to suppress any localized temperature increase, the gas permeability of the cell substrate 1 is reduced in the portion corresponding with the high-temperature portion in the cell module 10. In other words, in the case of co-flow, the gas permeability of the fuel gas outlet portion 1c in the cell substrate 1 is set to a lower value than the gas permeability of those portions in the cell substrate 1 other than the outlet portion 1c. By so doing, arrival of the fuel gas at the surface of the fuel electrode 2 is suppressed in the outlet portion 1c, resulting in a reduction in the amount of power generated in the downstream portion (the outlet portion 1c) of the unit cell. In this case, in order to achieve the same output from the unit cell, this reduction in the amount of power generated is compensated by an increase at the upstream side, resulting in an increase in the amount of power generated in the upstream portion (the inlet portion 1a). As a result, the temperature increases in the inlet portion 1a, which was the low-temperature portion, whereas the temperature decreases in the outlet portion 1c, meaning the high-temperature concentration in the outlet portion 1c can be alleviated, enabling a more uniform temperature across the entire cell module.

Figure 4:
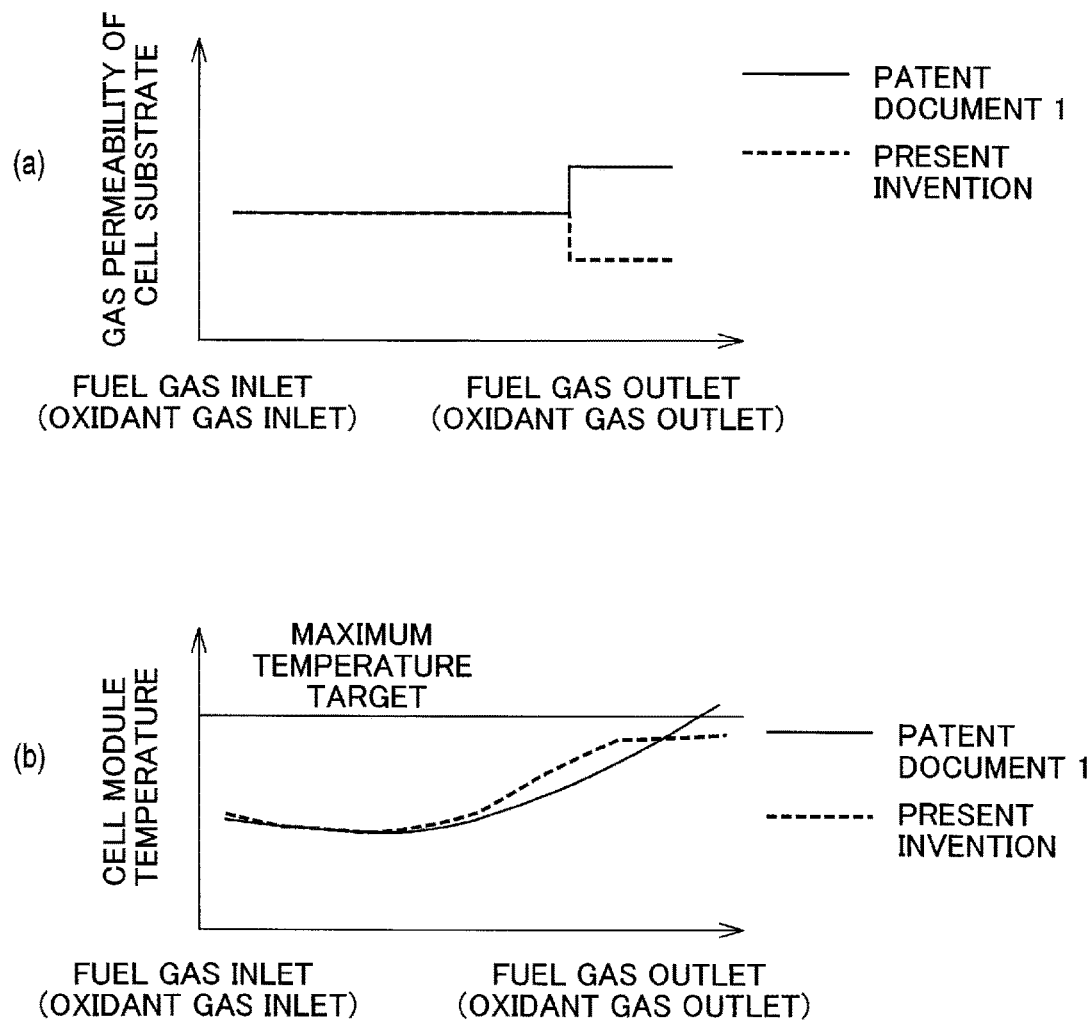
FIG. 4 is a set of graphs illustrating the relationships between the position along the gas flow direction, and the gas permeability of the cell substrate and the temperature of the cell module, in a cell module having co-flow of the fuel gas and the oxidant gas. (a) is a graph illustrating the relationship between the position along the gas flow direction in the cell module and the gas permeability of the cell substrate, and (b) is a graph illustrating the relationship between the position along the gas flow direction in the cell module and the temperature of the cell module.
Figure 5:
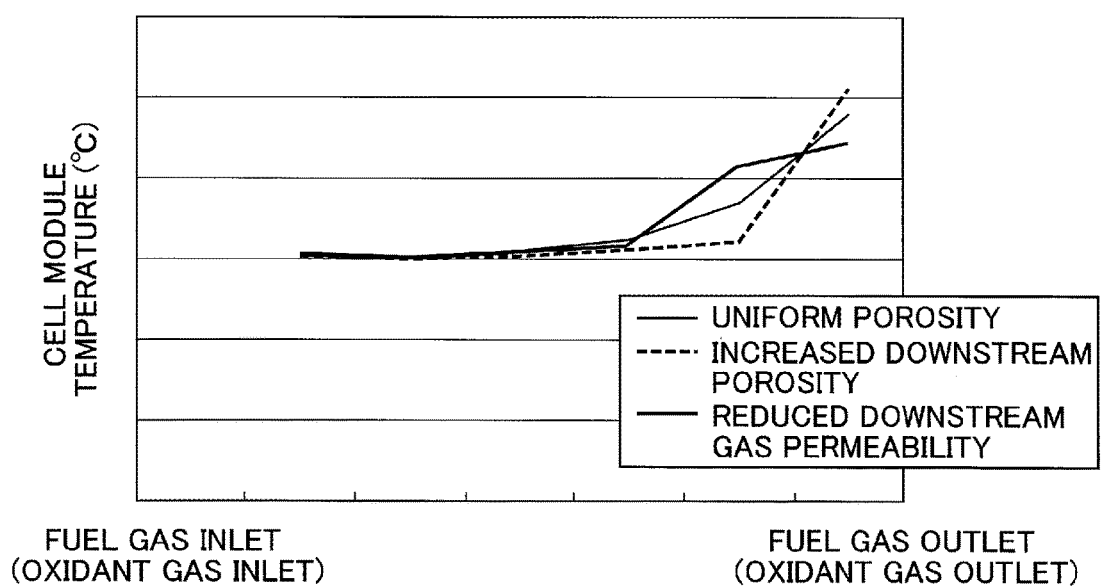
FIG. 5 is a graph illustrating the relationship between the position along the gas flow direction and the temperature of the cell module, in a cell module having co-flow of the fuel gas and the oxidant gas.

More specifically, as illustrated in FIG. 4(a), in Patent Document 1, the porosity is increased at the downstream side of the gas channels, thereby increasing the gas permeability. However, in the present embodiment, the gas permeability is lowered at the downstream side of the gas channels. Accordingly, as illustrated in FIG. 4(b) and FIG. 5, the temperature at the outlet portion is of the cell module 10 decreases compared with the structure described in Patent Document 1, meaning a state in which the temperature does not exceed the operation limit temperature can be maintained. As a result, heat degradation of the cell module 10 is suppressed, and the durability can be improved.

Figure 6:
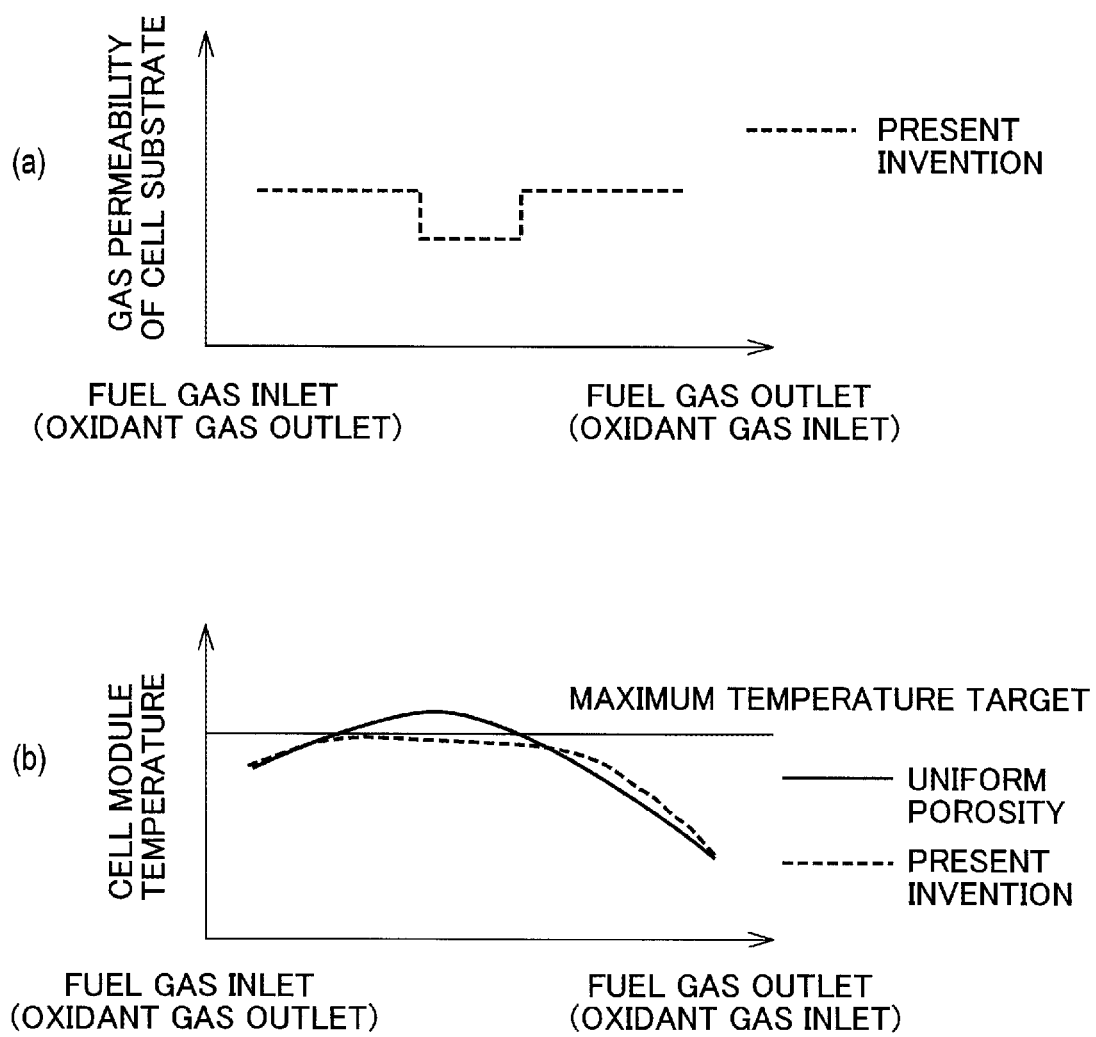
FIG. 6 is a set of graphs illustrating the relationships between the position along the gas flow direction, and the gas permeability of the cell substrate and the temperature of the cell module, in a cell module having counter-flow of the fuel gas and the oxidant gas. (a) is a graph illustrating the relationship between the position along the gas flow direction in the cell module and the gas permeability of the cell substrate, and (b) is a graph illustrating the relationship between the position along the gas flow direction in the cell module and the temperature of the cell module.

In a similar manner to that described above, in the case of counter-flow, as illustrated in FIG. 6, the gas permeability of the central portion 1b of the cell substrate 1 in the gas flow direction is set to a lower value than the gas permeability of the fuel gas inlet portion 1a and the outlet portion 1c in the cell substrate 1. By so doing, arrival of the fuel gas at the surface of the fuel electrode 2 is suppressed in the central portion 1b, resulting in suppression of the amount of power generated in the central portion 1b of the unit cell. In this case, in order to achieve the same output from the unit cell, this reduction in the amount of power generated is compensated by an increase at the inlet portion 1a and the outlet portion 1c outside of the central portion 1b, resulting in an increase in the amount of power generated in the portions other than the central portion 1b. As a result, as illustrated in FIG. 6(b), the temperature increases in the portions other than the central portion 1b, whereas the temperature decreases in the central portion 1b, meaning the high-temperature concentration in the central portion 1b can be alleviated, enabling a more uniform temperature across the entire unit cell.

Figure 7:
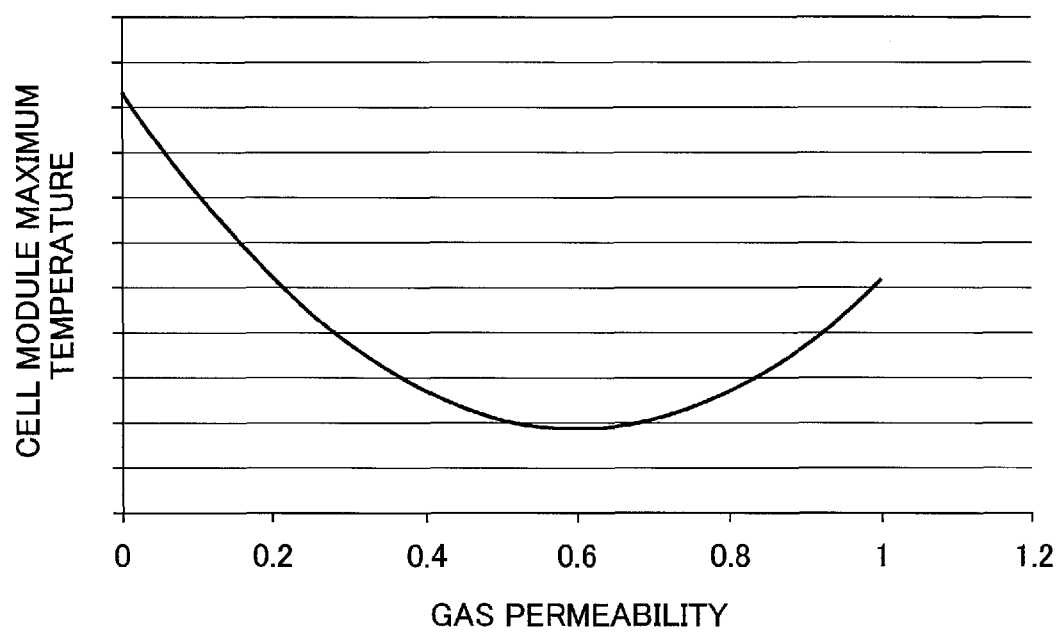
FIG. 7 is a graph illustrating the relationship between the gas permeability of the cell substrate and the temperature of the cell module.

FIG. 7 illustrates the relationship between the gas permeability of the cell substrate and the maximum temperature in a portion having a high cell module temperature. Specifically, in the case of co-flow, the figure illustrates the relationship between the gas permeability and the maximum temperature of the fuel gas outlet portion 1c in the cell substrate 1. Further, in the case of counter-flow, the figure illustrates the relationship between the gas permeability and the maximum temperature of the central portion 1b of the cell substrate 1 in the gas flow direction. In FIG. 7, a gas permeability of 1.0 indicates a gas permeability of the same level as other locations in the cell substrate. Further, a gas permeability of 0.6 means that 60% of the gas is transmitted compared with other locations, namely a 40% reduction in the amount of gas permeation.

As illustrated in FIG. 7, when the gas permeability is reduced, the maximum temperature of the cell module tends to decrease, but if the gas permeability is further reduced, the maximum temperature of the cell module starts to increase again. The point at which the maximum temperature of the cell module reaches its lowest level is at a gas permeability of about 0.6. Accordingly, when due consideration is given to the cell substrate production conditions and the temperature reduction effect for the cell module, the gas permeability is preferably within a range from 0.4 to 0.8, and is more preferably from 0.5 to 0.7. In other words, in the cell substrate 1, the gas permeability of the portion having low gas permeability has a gas permeability that is preferably 40 to 80%, and more preferably 50 to 70%, lower, than of the gas permeability of the other portions having high gas permeability.

There are no particular limitations on the method used for measuring the gas permeability of the cell substrate 1, provided the relative values for the gas permeability in the low-gas permeability portion and the gas permeability in the other portions can be determined. The gas permeability of the cell substrate 1 may be measured, for example, using a differential pressure gas permeability evaluation device.

Next is a description of the method used for changing the gas permeability of the cell substrate 1 using a reactive gas flow device. For the sake of convenience, a method for reducing the gas permeability in the central portion 1b of the cell substrate 1 in a counter-flow structure is described. A method for reducing the gas permeability in the outlet portion 1c of the cell substrate 1 in a co-flow structure may be performed in a similar manner.

In the present embodiment, the gas permeability of the cell substrate 1 can be reduced by providing a dense portion formed by compressing the cell substrate 1. In other words, by subjecting the cell substrate 1 having uniform gas permeability to compression to form an indentation in the portion for which the gas permeability is to be reduced, a portion of changed gas permeability can be formed.

Figure 8:
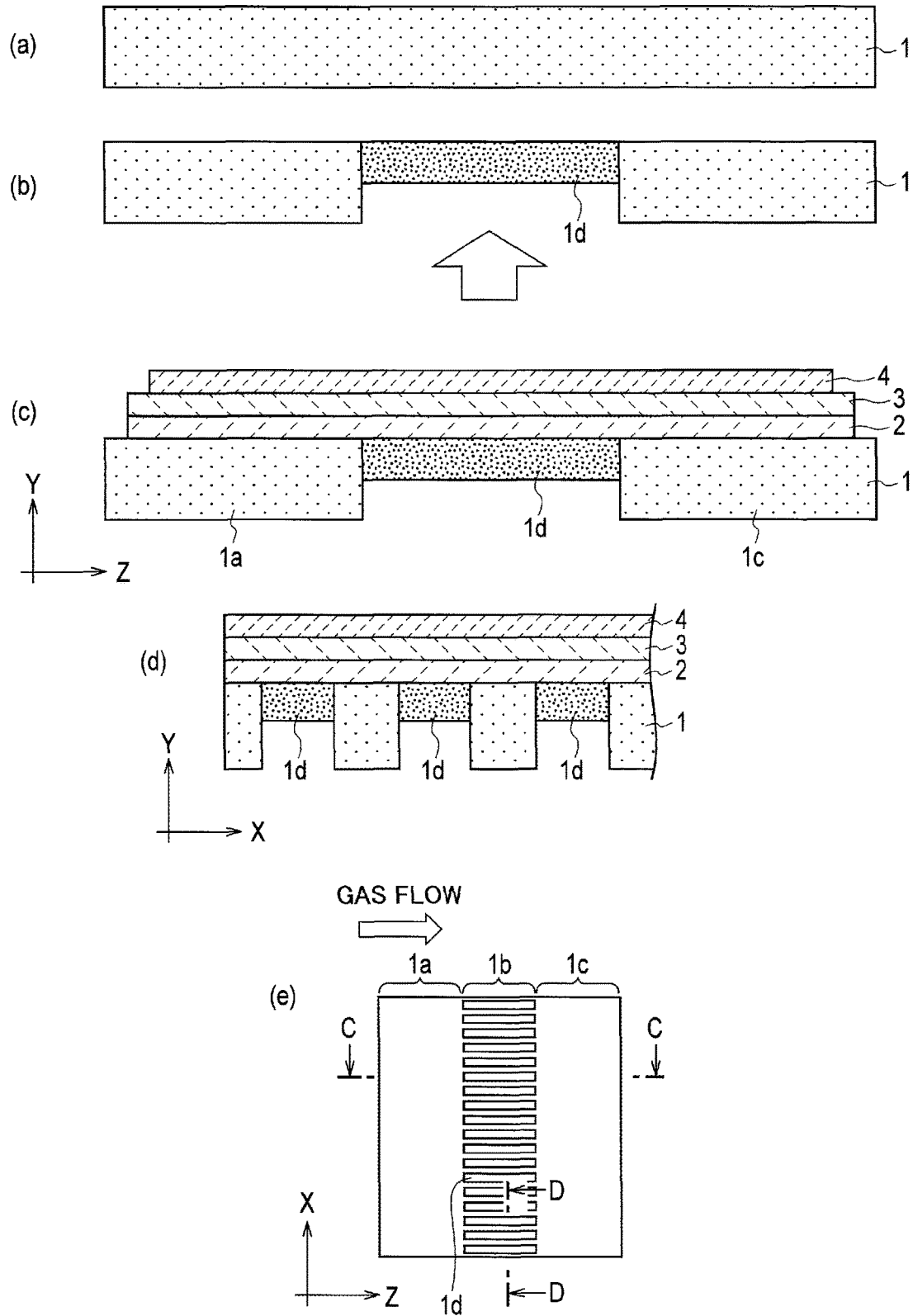
FIG. 8 is a series of drawings illustrating a method for producing a cell module according to a first embodiment. (a) is a schematic cross-sectional view illustrating a cell substrate having uniform gas permeability, and (b) is a schematic cross-sectional view illustrating a cell substrate that has been subjected to compression. (c) illustrates a state in which an air electrode, a solid electrolyte and a fuel electrode have been stacked on the cell substrate that has been subjected to compression, and is a schematic cross-sectional view along the line C-C of (e). (d) is a schematic cross-sectional view along the line D-D of (e). (e) is a bottom view of the cell module of this embodiment.

Specifically, as illustrated in FIGS. 8(a) and (b), by subjecting the cell substrate 1 having uniform gas permeability to compression from the underside of the cell substrate 1 to form an indentation in the portion for which the gas permeability is to be reduced, a dense portion 1d is formed. As illustrated in FIG. 8(c), by stacking the fuel electrode 2, the solid electrolyte 3 and the air electrode 4 on the flat surface (the upper surface) on the opposite side to the lower surface of the cell substrate 1, the cell module 10 can be obtained. There are no particular limitations on the stacking method for the fuel electrode 2, the solid electrolyte 3 and the air electrode 4, and conventional methods may be used.

Because this type of dense portion 1d is formed by compressing the cell substrate 1 and increasing the density, the fuel gas penetrates less readily. Accordingly, in the dense portion 1d, the permeability of the fuel gas decreases, and the amount of fuel gas penetrating through to the fuel electrode 2 decreases. Consequently, the amount of power generation decreases for the unit cell opposing this dense portion that has undergone this type of compression, enabling the maximum temperature of the cell module to be reduced. Further, by adjusting the amount of compression of the dense portion 1d, namely the thickness and density of the dense portion, the desired gas permeability can be achieved with ease.

The dense portion 1d may be formed across the entire portion in which the gas permeability is to be reduced. In other words, in the case of counter-flow, the dense portion 1d may be formed across the entire central portion 1b of the cell substrate 1. Further, in the case of co-flow, the dense portion 1d may be formed across the entire outlet portion 1c of the cell substrate 1. However, because the dense portion 1d is formed by compressing and indenting the underside of the cell substrate 1, there is a possibility that the indented portion may not make contact with the ribs of the fuel electrode interconnector 21, meaning conduction between the cell substrate 1 and the fuel electrode interconnector 21 may not be able to be satisfactorily ensured.

Accordingly, as illustrated in FIGS. 8(c), (d) and (e), in the present embodiment it is preferable that the dense portion 1d is formed in an elongated shape along the direction of flow of the fuel gas (the Z direction), and that a plurality of dense portions 1d are provided along the direction perpendicular to the Z direction (namely the X direction) with spaces provided therebetween. By providing a plurality of dense portions 1d in this manner, with spaces provided therebetween, the cell substrate 1 and the fuel electrode interconnector 21 can make electrical contact even in the portion in which the gas permeability is to be reduced. As a result, satisfactory conduction between the cell substrate 1 and the fuel electrode interconnector 21 can be ensured. Further, by providing the plurality of dense portions 1d with spaces therebetween, and also adjusting the width, the spacing and the density of the dense portions 1d, the desired gas permeability can be achieved.

In this embodiment, there are no particular limitations on the cell substrate 1, provided it has gas permeability and has sufficient strength to function as a support, but a substrate having high electrical conductivity is preferred. Examples of materials that can be used include plate-like substrates formed from stainless steel or corrosion-resistant alloys or corrosion-resistant steel containing nickel (Ni) and/or chromium (Cr), and having a plurality of openings formed in the plate. Specific examples include punched metal substrates, etched metal substrates, expanded metal substrates, foamed metal bodies, metal powder sintered compacts, metal meshes such as wire gauze, and metal nonwoven fabric formed from the above types of materials. Further, if necessary, layers of the same material or different materials may be stacked to form the substrate.

Examples of materials that can be used favorably as the fuel electrode 2 include materials that are resistant to a reducing atmosphere, allow the transmission of the fuel gas, have high electrical conductivity, and have a catalytic action on the conversion of hydrogen molecules to protons. In some cases, lone metals such as nickel (Ni) may be used as the material for the fuel electrode, but the use of a cermet containing an oxygen ion conductor, typified by yttria-stabilized zirconia (YSZ), is preferable. By using this type of material, the reaction area can be increased, and the electrode performance can be improved. Ceria solid solutions such as samaria-doped ceria (SDC) and gadolinia-doped ceria (GDC) can also be used instead of yttria-stabilized zirconia (YSZ).

Examples of materials that can be used favorably as the air electrode 4 include materials that are resistant to an oxidizing atmosphere, allow the transmission of the oxidant gas, have high electrical conductivity, and have a catalytic action on the conversion of oxygen molecules to oxide ions. The air electrode 4 may be formed solely from the electrode catalyst, or may be formed from a cermet of the electrode catalyst and an electrolyte material. In some cases, metals such as silver (Ag) and platinum (Pt) may be used as the material for the electrode catalyst, but the use of a perovskite oxide such as lanthanum strontium cobaltite ($La_{1-x}Sr_xCoO_3$:

LSC), lanthanum strontium cobalt ferrite ($La_{1-x}Sr_xCo_{1-y}Fe_yO_3$: LSCF), samarium strontium cobaltite ($Sm_xSr_{1-x}CoO_3$: SSC) or lanthanum strontium manganite ($La_{1-x}Sr_xMnO_3$: LSM) is preferred. However, this is not an exhaustive list, and conventionally known air electrode materials can be used. Further, one of these materials may be used alone, or a combination of a plurality of materials may be used. Moreover, examples of the electrolyte material include cerium oxide ($CeO_2$), zirconium oxide ($ZrO_2$), titanium oxide ($TiO_2$) and lanthanum oxide ($La_2O_3$), but this is not an exhaustive list, and mixtures with oxides such as any of the various stabilized zirconia materials and ceria solid solutions can also be used favorably.

Examples of materials that can be used favorably, as the solid electrolyte 3 include materials having gas impermeability and an ability to allow the passage of oxygen ions without conducting electrons. Specific examples of the material used for forming the solid electrolyte include stabilized zirconia solid solutions with yttria ($Y_2O_3$), neodymium oxide ($Nd_2O_3$), samaria ($Sm_2O_3$), gadolinia ($Gd_2O_3$), or scandia ($Sc_2O_3$) or the like. Further, ceria solid solutions such as samaria-doped ceria (SDC), yttria-doped ceria (YDC) and gadolinia-doped ceria (GDC), as well as bismuth oxide ($Bi_2O_3$) and lanthanum strontium magnesium gallate ($La_{1-x}Sr_xGa_{1-y}Mg_yO_3$: LSMG) can also be used.

In this manner, the cell module 10 of the present embodiment has a cell substrate 1 having gas permeability, an electrode 2 that is one of a fuel electrode and an air electrode formed on top of the cell substrate 1, a solid electrolyte 3 formed on top of the electrode 2, and the other electrode 4 formed on top of the solid electrolyte 3. Then, in the case of counter-flow of the fuel gas and the oxidant gas flow, a structure is formed in which the gas permeability of the central portion 1b of the cell substrate 1 in the gas flow direction is lower than the gas permeability of the inlet portion 1a and the outlet portion 1c of the cell substrate 1. Further, when the cell module 10 of the present embodiment has a structure having co-flow of the fuel gas and the oxidant gas flow, a structure is formed in which the gas permeability of the outlet portion 1c of the cell substrate 1 in the gas flow direction is lower than the gas permeability of those portions in the cell substrate 1 other than the outlet portion 1c. Accordingly, the amount of power generation decreases for the unit cell opposing the portion of the cell substrate 1 having reduced gas permeability, and therefore the maximum temperature of the cell module can be reduced, and the durability of the cell module can be improved.

Furthermore, in the cell module 10 of the present embodiment, the gas permeability of the cell substrate 1 is reduced by providing the dense portion 1d produced by compressing the cell substrate 1. Because the dense portion 1d is formed in this manner, by compressing and indenting the portion for which the gas permeability is to be reduced, the gas permeability can be reduced using a simple method.

In the above description, the cell substrate 1 was divided into three portions along the direction of gas flow (the Z direction), with those portions prescribed in order from the upstream side of the fuel gas flow as the inlet portion 1a, the central portion 1b and the outlet portion 1c. However, the present embodiment is not limited to this particular configuration. In other words, the cell substrate 1 may be divided into three or more portions along the direction of gas flow (the Z direction), with the portion that includes the fuel gas inlet prescribed as the inlet portion 1a, the portion that includes the fuel gas outlet prescribed as the outlet portion 1c, and the high-temperature portion located between the inlet portion 1a and the outlet portion 1c prescribed as the central portion 1b.

[Second Embodiment]

Next, a cell module for a solid oxide fuel cell according to a second embodiment is described in detail based on the drawings. Those structures that are the same as the first embodiment are labeled with the same symbols, and duplicate descriptions are omitted.

In the cell module of this embodiment, in the case of counter-flow, the formation of a structure in which the gas permeability of the central portion 1b of the cell substrate 1 is lower than the gas permeability of the inlet portion 1a and the outlet portion 1c is the same as the first embodiment. Further, in the case of co-flow, the formation of a structure in which the gas permeability of the outlet portion 1c of the cell substrate 1 is lower than the gas permeability of those portions other than the outlet portion 1c is also the same as the first embodiment. This embodiment differs from the first embodiment in terms of the method used for changing the gas permeability of the cell substrate 1. For the sake of convenience, the method used for reducing the gas permeability in the central portion 1b of the cell substrate 1 is described, but the method for reducing the gas permeability in the outlet portion 1c may be performed in a similar manner.

In this embodiment, the gas permeability of the cell substrate 1 can be adjusted by providing a groove-shaped notch in the cell substrate 1. In other words, in those portions of a cell substrate 1 having uniform gas permeability in which the gas permeability is to be increased (for example, the inlet portion 1a and the outlet portion 1c), the surface of the substrate is cut away to form a groove, thereby changing the gas permeability.

Figure 9:
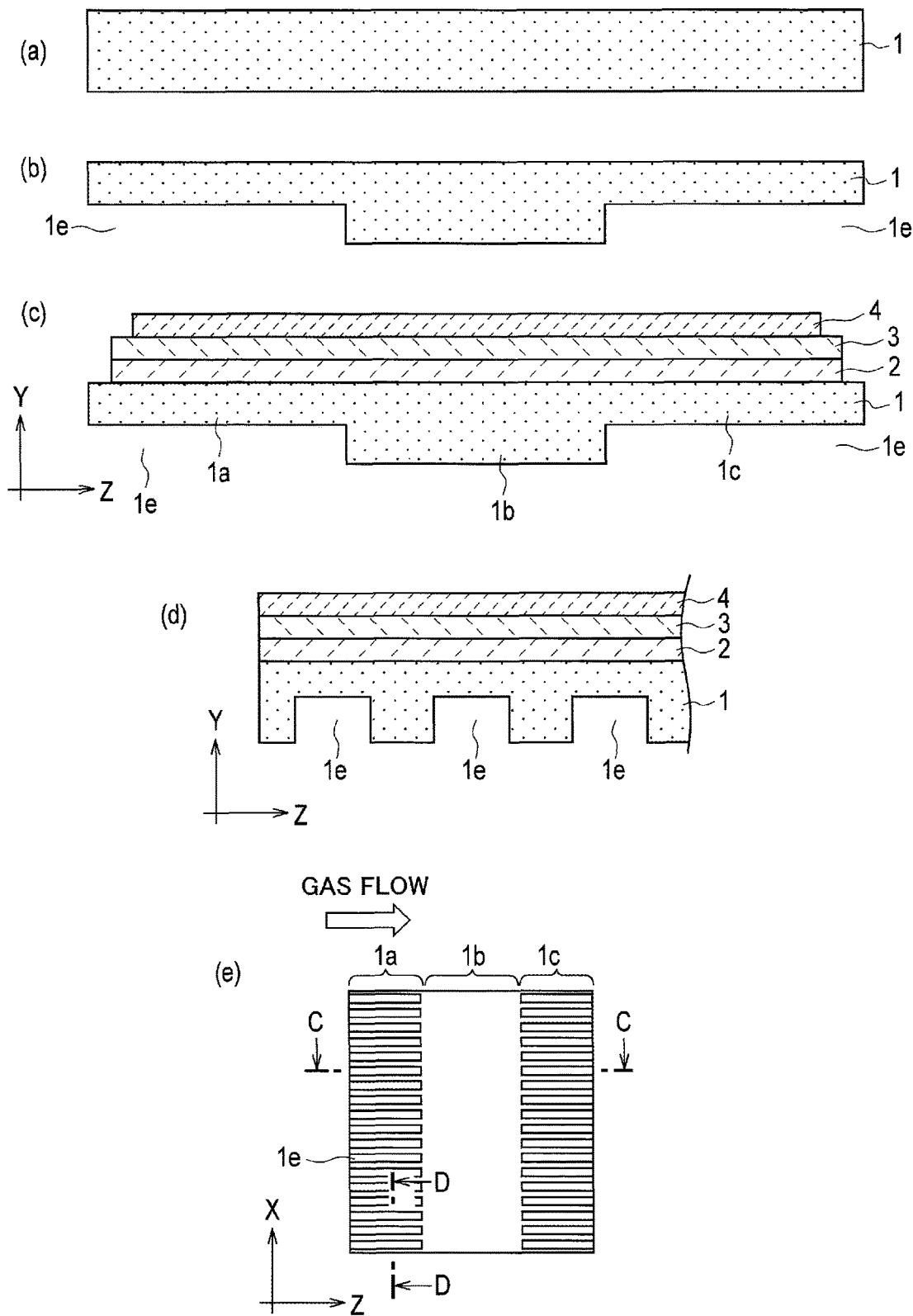
FIG. 9 is a series of drawings illustrating a method for producing a cell module according to a second embodiment. (a) is a schematic cross-sectional view illustrating a cell substrate having uniform gas permeability, and (b) is a schematic cross-sectional view illustrating a cell substrate that has been subjected to notching. (c) illustrates a state in which an air electrode, a solid electrolyte and a fuel electrode have been stacked on the cell substrate that has been subjected to notching, and is a schematic cross-sectional view along the line C-C of (e). (d) is a schematic cross-sectional view along the line D-D of (e). (e) is a bottom view of the cell module of this embodiment.

Specifically, as illustrated in FIGS. 9(a) and (b), the cell substrate 1 having uniform gas permeability is subjected to partial removal of the lower surface of the substrate to provide notches in those portions in which the gas permeability is to be increased, and the portion in which the gas permeability is to be reduced is left uncut. Then, as illustrated in FIG. 9(c), by stacking the fuel electrode 2, the solid electrolyte 3 and the air electrode 4 on the flat surface (the upper surface) on the opposite side to the lower surface of the cell substrate 1, the cell module 10 can be obtained. There are no particular limitations on the stacking method for the fuel electrode 2, the solid electrolyte 3 and the air electrode 4, and conventional methods may be used.

In this manner, by partially cutting and removing the cell substrate 1 and providing the notches 1e, the fuel gas is able to penetrate more readily into the cell substrate 1 in the inlet portion 1a and the outlet portion 1c where the notches 1e are provided, resulting in an increase in the gas permeability. In contrast, in the central portion 1b of the cell substrate 1 where the notches 1e are not provided, the gas permeability is maintained at the original level. Accordingly, viewing the overall cell module, the gas permeability of the central portion 1b of the cell substrate 1 decreases relatively. Accordingly, because the amount of power generation decreases for the unit cell opposing the central portion 1b that has not been subjected to this type of notching, the maximum temperature of the cell module can be reduced. Further, the size of the reduction in the gas permeability can be easily adjusted by adjusting the width and cutting depth of the notches.

The notches 1e may be formed across the entire portion in which the gas permeability is to be increased. In other words, in the case of counter-flow, the notches 1e may be formed across the entire inlet portion 1a and outlet portion 1c of the cell substrate 1. Further, in the case of co-flow, the notches 1e may be formed across the entire inlet portion 1a and central portion 1b of the cell substrate 1. However, because the notches 1e are formed by partially cutting and removing the underside of the cell substrate 1, there is a possibility that the removed portion may not make contact with the ribs of the fuel electrode interconnector 21, meaning conduction between the cell substrate 1 and the fuel electrode interconnector 21 may not be able to be satisfactorily ensured. Further, if the size of the notches 1e is increased, there is a possibility that the strength of the cell substrate may decrease excessively.

Accordingly, as illustrated in FIGS. 9(c), (d) and (e), in the present embodiment it is preferable that the notches 1e are formed in elongated shapes along the direction of flow of the fuel gas (the Z direction), and that a plurality of notches 1e are provided along the direction perpendicular to the Z direction (namely the X direction) with spaces provided therebetween. By providing a plurality of notches 1e in this manner, with spaces provided therebetween, the cell substrate 1 and the fuel electrode interconnector 21 can make electrical contact, meaning satisfactory conduction between the two can be ensured. Further, by providing the plurality of notches 1e with spaces therebetween, and also adjusting the width, the spacing and the cutting depth of the notches 1e, the desired gas permeability can be achieved.

In this manner, in the present embodiment, the gas permeability of the cell substrate 1 is adjusted by providing groove-shaped notches in the cell substrate 1. In other words, the gas permeability of the cell substrate 1 is adjusted by lowering the apparent volume of the cell substrate 1. Accordingly, by notching the inlet portion 1a and the outlet portion 1c of the cell substrate 1, and reducing the apparent volume of the cell substrate 1 formed from the porous material, the gas permeability of the inlet portion 1a and the outlet portion 1c can be increased, resulting in a relative decrease in the gas permeability of the central portion 1b.

[Third Embodiment]

Next, a cell module for a solid oxide fuel cell according to a third embodiment is described in detail based on the drawings. Those structures that are the same as the first embodiment are labeled with the same symbols, and duplicate descriptions are omitted.

In this embodiment, the method used for changing the gas permeability of the cell substrate 1 differs from that of the first embodiment. For the sake of convenience, the method used for reducing the gas permeability in the central portion 1b of the cell substrate 1 is described, but the method for reducing the gas permeability in the outlet portion 1c may be performed in a similar manner.

In the present embodiment, the gas permeability of the cell substrate 1 can be reduced by lowering the porosity of the porous material that constitutes the cell substrate 1. In other words, by subjecting the cell substrate 1 having uniform gas permeability to additional compression to implant a porous plate into the portion of the cell substrate in which the gas permeability is to be reduced, a portion of changed gas permeability can be formed.

Figure 10:
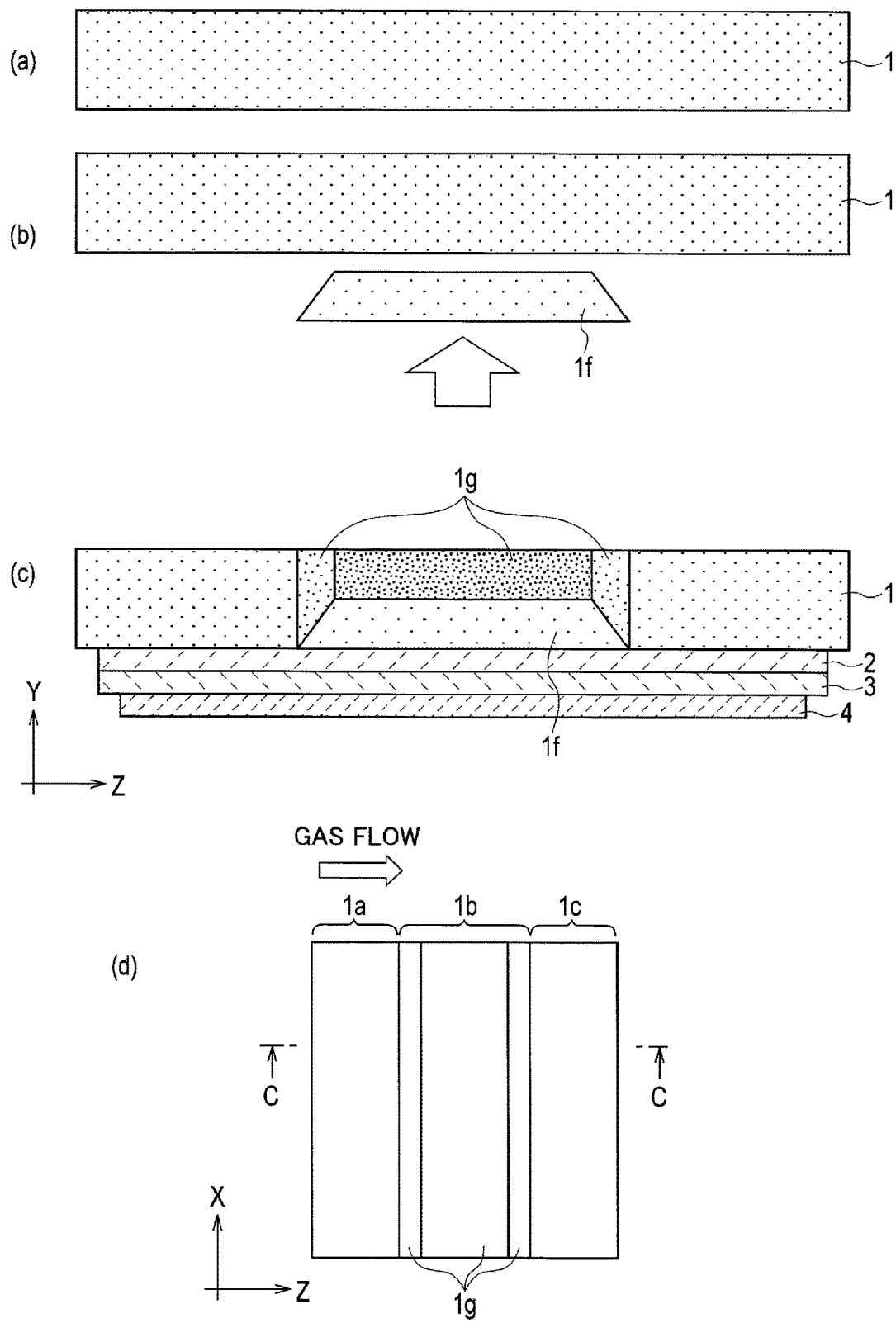
FIG. 10 is a series of drawings illustrating a method for producing a cell module according to a third embodiment. (a) is a schematic cross-sectional view illustrating a cell substrate having uniform gas permeability, and (b) is a schematic cross-sectional view illustrating a state prior to the implantation of a porous plate into the cell substrate. (c) is a schematic cross-sectional view illustrating a state in which an air electrode, a solid electrolyte and a fuel electrode have been stacked on the cell substrate provided with an implanted portion. (d) is a plan view of the cell module of this embodiment.

Specifically, as illustrated in FIGS. 10(a) and (b), a porous plate 1f is compressed into the lower surface of the cell substrate 1 having uniform gas permeability, in the portion in which the gas permeability is to be lowered, and by implanting the porous plate 1f within the interior of the cell substrate 1, an implanted portion 1g is formed. Then, as illustrated in FIG. 10(c), because the lower surface of the cell substrate 1 following implantation can be made flat, by subsequently stacking the fuel electrode 2, the solid electrolyte 3 and the air electrode 4 on the lower surface, the cell module 10 can be obtained. There are no particular limitations on the stacking method for the fuel electrode 2, the solid electrolyte 3 and the air electrode 4, and conventional methods may be used.

In this type of implanted portion 1g, the implantation of the porous plate 1f in the cell substrate 1 causes a reduction in the porosity, meaning the fuel gas penetrates less readily. Accordingly, in the implanted portion 1g, the permeability of the fuel gas decreases, and the amount of fuel gas penetrating through to the fuel electrode 2 decreases. Consequently, the amount of power generation decreases for the unit cell opposing this implanted portion 1g, enabling the maximum temperature of the cell module to be reduced. Further, by adjusting the thickness of the porous plate 1f used for forming the implanted portion 1g, the desired gas permeability can be achieved easily.

In this embodiment, the implanted portion 1g is formed by compressing the porous plate 1f against the surface of the cell substrate 1 and implanting the porous plate 1f within the interior of the cell substrate 1. Accordingly, because both the upper surface and the lower surface of the cell substrate 1 can be formed as flat surfaces, the fuel electrode 2, the solid electrolyte 3 and the air electrode 4 can be stacked on the lower surface of the cell substrate 1, as illustrated in FIG. 10(c). The fuel electrode 2, the solid electrolyte 3 and the air electrode 4 may also be formed on the upper surface of the cell substrate 1.

Further, because both the upper surface and the lower surface of the cell substrate 1 can be formed as flat surfaces, a larger contact surface area can be ensured between the fuel electrode interconnector 21 and the ribs compared with the cell substrates of the first and second embodiments. Accordingly, compared with the first and second embodiments, the cell module of the present embodiment enables the power generation performance to be further improved.

In a similar manner to the cell substrate 1, examples of materials that can be used for forming the porous plate 1f include plate-like substrates formed from stainless steel or corrosion-resistant alloys or corrosion-resistant steel containing nickel (Ni) and/or chromium (Cr), and having a plurality of openings formed in the plate. Specific examples include punched metal substrates, etched metal substrates, expanded metal substrates, foamed metal bodies, metal powder sintered compacts, metal meshes such as wire gauze, and metal nonwoven fabric formed from the above types of materials. Further, the shape of the porous plate 1f is not limited to the frustum-shaped plate illustrated in FIG. 10, and for example, a rectangular prism-shaped plate may also be used.

[Fourth Embodiment]

Next, a cell module for a solid oxide fuel cell according to a fourth embodiment is described in detail based on the drawings. Those structures that are the same as the third embodiment are labeled with the same symbols, and duplicate descriptions are omitted.

Figure 11:
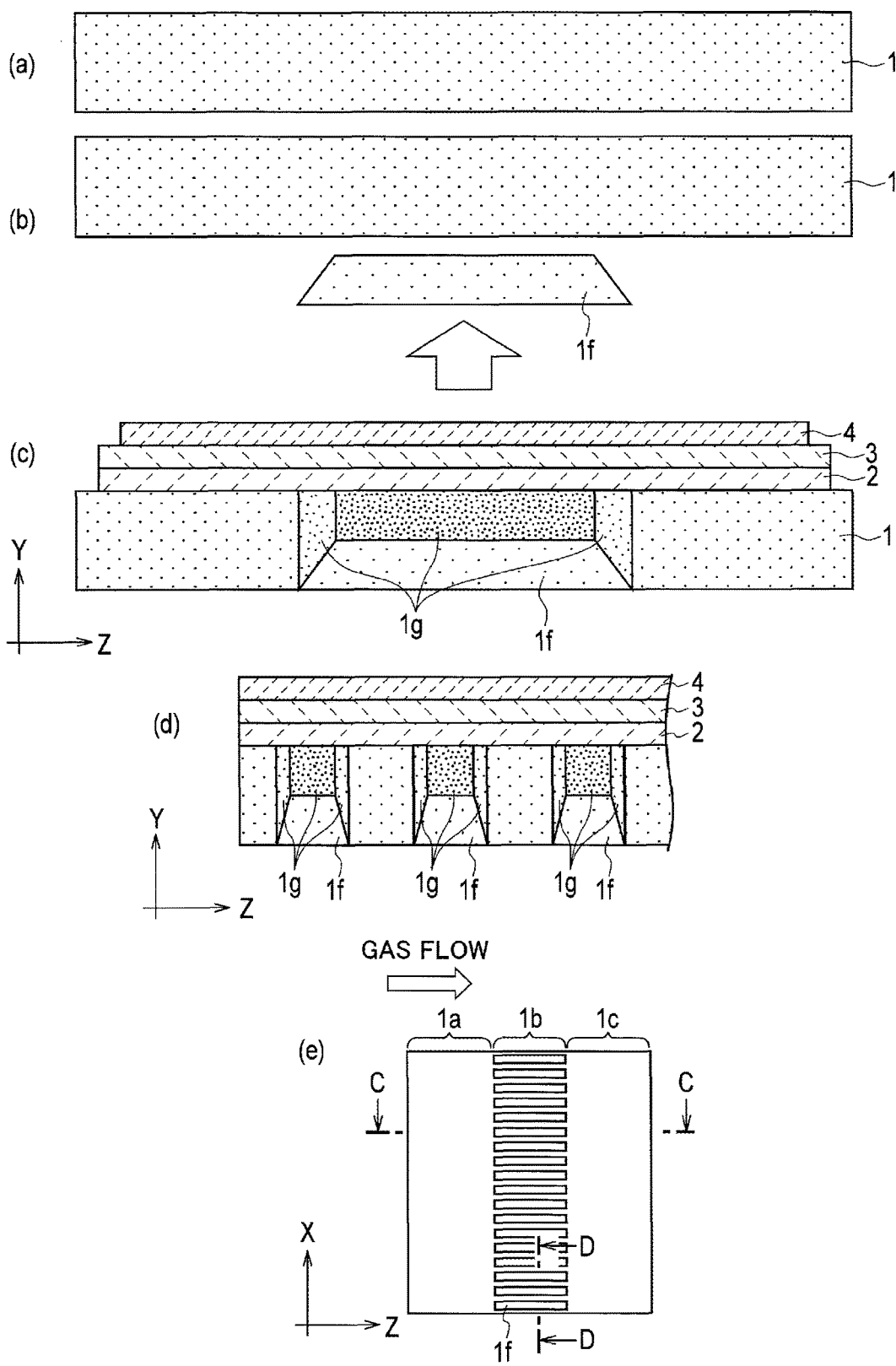
FIG. 11 is a series of drawings illustrating a method for producing a cell module according to a fourth embodiment. (a) is a schematic cross-sectional view illustrating a cell substrate having uniform gas permeability, and (b) is a schematic cross-sectional view illustrating a state prior to the implantation of a porous plate into the cell substrate. (c) illustrates a state in which an air electrode, a solid electrolyte and a fuel electrode have been stacked on the cell substrate provided with an implanted portion, and is a schematic cross-sectional view along the line C-C in (e). (d) is a schematic cross-sectional view along the line D-D of (e). (e) is a bottom view of the cell module of this embodiment.

In this embodiment, the gas permeability of the cell substrate 1 is reduced by lowering the porosity of the porous material that constitutes the cell substrate 1, in a similar manner to the third embodiment. Specifically, as illustrated in FIGS. 11(a) and (b), a porous plate 1f is compressed into the lower surface of the cell substrate 1 having uniform gas permeability, in the portion in which the gas permeability is to be lowered, and by implanting the porous plate 1f within the interior of the cell substrate 1, an implanted portion 1g is formed. Then, as illustrated in FIG. 11(c), by stacking the fuel electrode 2, the solid electrolyte 3 and the air electrode 4 on the upper surface of the cell substrate 1, the cell module 10 can be obtained.

In this embodiment, as illustrated in FIGS. 11(c), (d) and (e), each implanted portion 1g is formed in an elongated shape along the direction of flow of the fuel gas (the Z direction), and a plurality of these implanted portions 1g are provided along the direction perpendicular to the Z direction (namely the X direction) with spaces provided therebetween. By providing a plurality of implanted portions 1g in this manner, with spaces provided therebetween, and by adjusting the width and the spacing of the implanted portions 1g, the desired gas permeability can be achieved.

Further, in a similar manner to the third embodiment, because both the upper surface and the lower surface of the cell substrate 1 can be formed as flat surfaces, a larger contact surface area can be ensured between the fuel electrode interconnector 21 and the ribs compared with the cell substrates of the first and second embodiments. Accordingly, compared with the first and second embodiments, the cell module of the present embodiment enables the power generation performance to be further improved.

[Fifth Embodiment]

Next, a cell module for a solid oxide fuel cell according to a fifth embodiment is described in detail based on the drawings. Those structures that are the same as the first embodiment are labeled with the same symbols, and duplicate descriptions are omitted.

In this embodiment, the method used for changing the gas permeability of the cell substrate 1 differs from that of the first embodiment. For the sake of convenience, the method used for reducing the gas permeability in the central portion 1b of the cell substrate 1 is described, but the method for reducing the gas permeability in the outlet portion 1c may be performed in a similar manner.

In the present embodiment, the gas permeability of the cell substrate 1 can be reduced by lowering the porosity of the porous material that constitutes the cell substrate 1. Specifically, as illustrated in FIGS. 12(a) and (b), the gas permeability of the cell substrate 1 is adjusted by using two types of porous structures having different porosities and therefore different levels of gas permeability, and bonding those two structures together.

As illustrated in FIG. 12(a), the cell substrate 1 of this embodiment is formed using a low-permeability structure 1h and a high-permeability structure 1i having higher gas permeability than the low-permeability structure 1h. The thickness of the central portion 1b in the low-permeability structure 1h is increased, whereas the thickness of the central portion 1b in the high-permeability structure 1i is reduced. In other words, within the central portion 1b, the thickness of the low-permeability structure 1h in the stacking direction (the Y direction) is larger than the thickness of the high-permeability structure 1i. Further, the thickness of the inlet portion 1a and the outlet portion 1c in the low-permeability structure 1h is made relatively smaller, whereas the thickness of the inlet portion 1a and the outlet portion 1c in the high-permeability structure 1i is made relatively larger. In other words, within the inlet portion 1a and the outlet portion 1c, the thickness of the low-permeability structure 1h in the stacking direction (the Y direction) is smaller than the thickness of the high-permeability structure 1i.

As illustrated in FIG. 12(a), by inserting the protruding central portion 1b in the low-permeability structure 1h into the recessed central portion 1b in the high-permeability structure 1i, thereby stacking the two structures, the cell substrate 1 according to the present embodiment is obtained. By bonding the thicker portion of the low-permeability structure 1h in the portion in which the gas permeability is to be lowered, and bonding the thicker portion of the high-permeability structure 1i in the portions other than the portion in which the gas permeability is to be lowered, the gas permeability can be adjusted with ease.

Subsequently, by stacking the fuel electrode 2, the solid electrolyte 3 and the air electrode 4 on the obtained cell substrate 1, the cell module 10 can be obtained. There are no particular limitations on the stacking method for the fuel electrode 2, the solid electrolyte 3 and the air electrode 4, and conventional methods may be used.

By using this type of structure, the permeability of the fuel gas decreases in the portion where the low-permeability structure 1h is thicker, meaning the amount of fuel gas penetrating through to the fuel electrode 2 decreases. Consequently, the amount of power generation decreases for the unit cell opposing this portion where the low-permeability structure 1h is thicker, enabling the maximum temperature of the cell module to be reduced. Further, by adjusting the thickness of the low-permeability structure 1h, and the levels of gas permeability of the low-permeability structure 1h and the high-permeability structure 1i, the desired gas permeability can be achieved easily.

Figure 12:
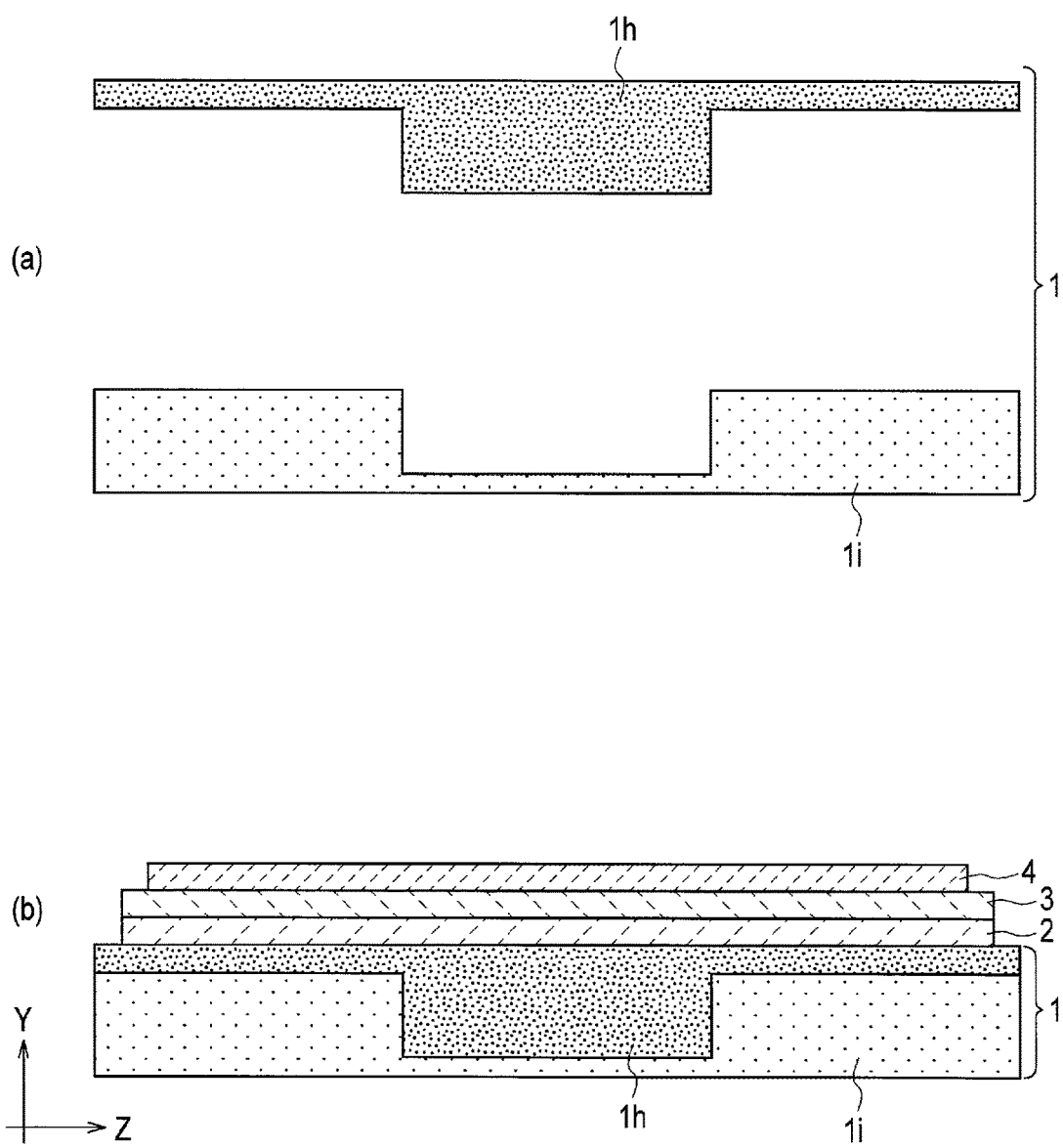
FIG. 12 is a series of drawings illustrating a method for producing a cell module according to a fifth embodiment. (a) is a schematic cross-sectional view illustrating a state prior to bonding of a low-permeability structure and a high-permeability structure, and (b) is a schematic cross-sectional view illustrating a state in which an air electrode, a solid electrolyte and a fuel electrode have been stacked on the cell substrate obtained by bonding the low-permeability structure and the high-permeability structure.

Further, as illustrated in FIG. 12, in the present embodiment, because both the upper surface and the lower surface of the cell substrate 1 can be formed as flat surfaces, a larger contact surface area can be ensured between the fuel electrode interconnector 21 and the ribs compared with the cell substrates of the first and second embodiments. Accordingly, compared with the first and second embodiments, the cell module of the present embodiment enables the power generation performance to be further improved.

[Sixth Embodiment]

Next, a cell module for a solid oxide fuel cell according to a sixth embodiment is described in detail based on the drawings. Those structures that are the same as the first embodiment are labeled with the same symbols, and duplicate descriptions are omitted.

In this embodiment, the method used for changing the gas permeability of the cell substrate 1 differs from that of the first embodiment. For the sake of convenience, the method used for reducing the gas permeability in the central portion 1b of the cell substrate 1 is described, but the method for reducing the gas permeability in the outlet portion 1c may be performed in a similar manner.

In the present embodiment, the gas permeability of the cell substrate 1 can be reduced by providing gas penetration bather members on the cell substrate 1. In other words, by installing gas penetration barrier members on the surface of the cell substrate 1 having uniform gas permeability in the portion where the gas permeability is to be reduced, thereby suppressing gas penetration within that portion, a portion of changed gas permeability can be formed.

Figure 13:
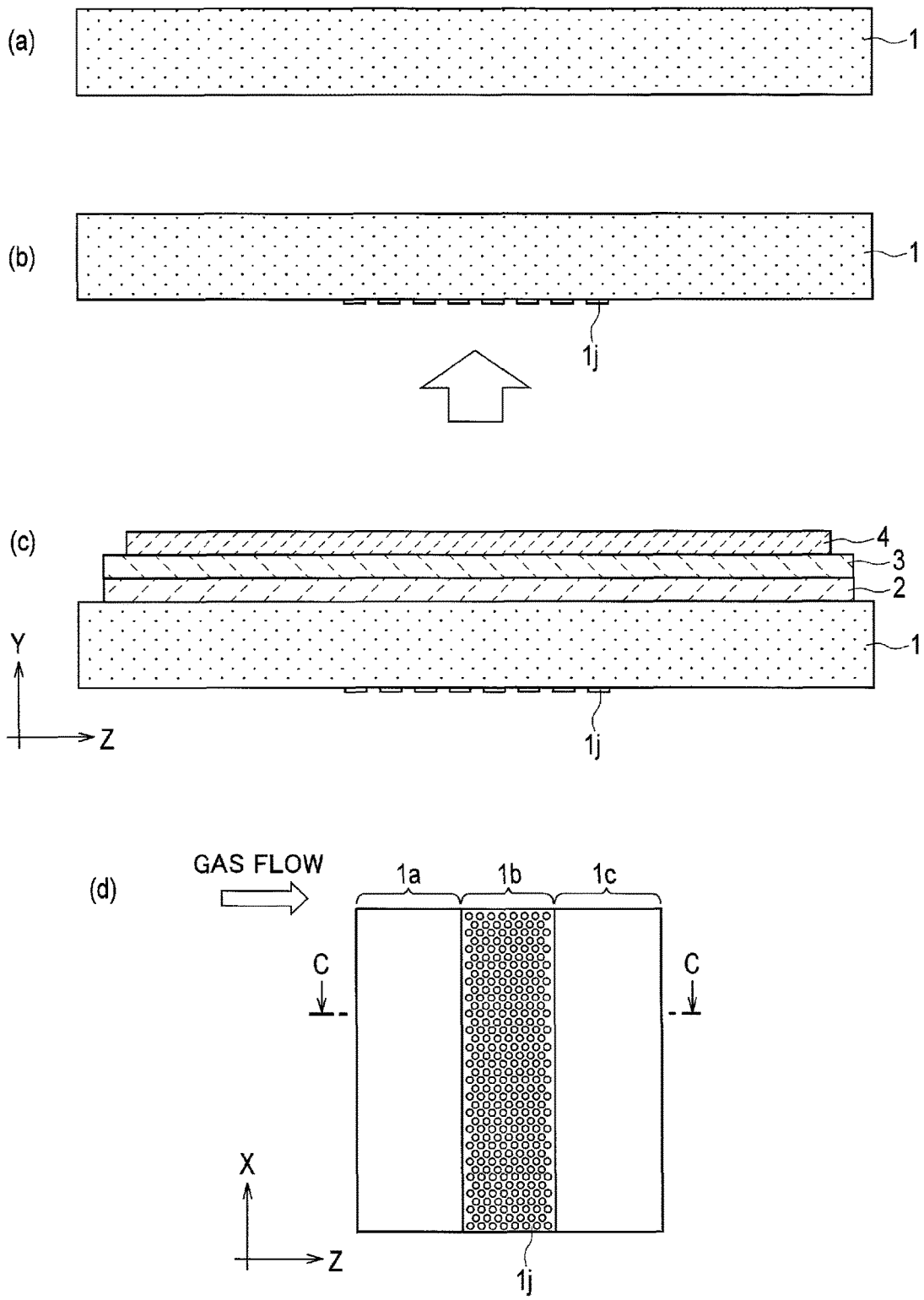
FIG. 13 is a series of drawings illustrating a method for producing a cell module according to a sixth embodiment. (a) is a schematic cross-sectional view illustrating a cell substrate having uniform gas permeability, and (b) is a schematic cross-sectional view illustrating a state in which gas penetration barrier members have been bonded to the cell substrate. (c) illustrates a state in which an air electrode, a solid electrolyte and a fuel electrode have been stacked on the cell substrate provided with the gas penetration barrier members, and is a schematic cross-sectional view along the line C-C in (d). (d) is a bottom view of the cell module of this embodiment.

Specifically, as illustrated in FIGS. 13(a) and (b), gas penetration barrier members 1j are bonded to the lower surface of the cell substrate 1 having uniform gas permeability, within the portion in which the gas permeability is to be reduced. Then, as illustrated in FIG. 13(c), by stacking the fuel electrode 2, the solid electrolyte 3 and the air electrode 4 on the upper surface of the cell substrate 1, the cell module 10 can be obtained. There are no particular limitations on the stacking method for the fuel electrode 2, the solid electrolyte 3 and the air electrode 4, and conventional methods may be used.

By providing these types of gas penetration barrier members 1j, the fuel gas penetrates less readily in the portion where the gas penetration barrier members 1j are bonded to the cell substrate 1. Accordingly, in the portion where the gas penetration barrier members 1j are provided, the permeability of the fuel gas decreases, and the amount of fuel gas that penetrates through to the fuel electrode 2 decreases. Consequently, the amount of power generation decreases for the unit cell opposing the portion where these types of gas penetration barrier members 1j are provided, enabling the maximum temperature of the cell module to be reduced.

There are no particular limitations on the gas penetration barrier members 1j, provided they are members capable of suppressing penetration of the fuel gas into the cell substrate 1. For example, the gas penetration barrier members 1j may be formed from the same material as the cell substrate 1, but employ a more dense structure, and may have a plurality of through-holes formed in the plate. Specifically, punched metal substrates, etched metal substrates, expanded metal substrates, foamed metal bodies, metal powder sintered compacts, metal meshes such as wire gauze, and metal nonwoven fabric and the like may be used. The gas penetration barrier members 1j may be bonded to the lower surface of the cell substrate 1, or may be partially embedded in the cell substrate 1.

Further, an interconnector that contacts the surface of the cell substrate 1 may also be used as the gas penetration barrier member 1j. In other words, by increasing the interconnector contact surface area in the location where gas penetration into the cell substrate 1 is to be suppressed, the amount of fuel gas penetrating into the interior of the cell substrate 1 can be suppressed. In contrast, by reducing the interconnector contact surface area in locations where gas penetration into the cell substrate 1 is to be increased, the amount of fuel gas penetrating into the interior of the cell substrate 1 can be increased. By using this type of structure, the amount of power generation by the unit cell can be adjusted, and the maximum temperature of the cell module can be reduced.

The content of the present invention has been described above with reference to a plurality of embodiments, but the present invention is in no way limited to the descriptions provided above, and it will be self-evident to a person skilled in the art that various alterations and modifications are possible.

DESCRIPTION OF THE SYMBOLS

1: Cell substrate
1a: Inlet portion
1b: Central portion
1c: Outlet portion
1e: Notch
1j: Gas penetration barrier member
2: Fuel electrode
3: Solid electrolyte
4: Air electrode
10: Cell module
20: Solid oxide fuel cell
21: Fuel electrode interconnector
22: Air electrode interconnector

The invention claimed is:

1. A cell module for a solid oxide fuel cell comprising:
a cell substrate having gas permeability,
one electrode comprising a fuel electrode or an air electrode, and formed on the cell substrate,
a solid electrolyte formed on the one electrode, and
another electrode comprising an other of the fuel electrode or the air electrode, and formed on the solid electrolyte, wherein
in a case of counter-flow of a fuel gas and an oxidant gas flow, a gas permeability of a central portion of the cell substrate in a gas flow direction is lower than a gas permeability of an inlet portion and an outlet portion of the cell substrate, and the cell module for a solid oxide fuel cell further comprises at least one of:
at least one dense portion formed by compressing the cell substrate, the at least one dense portion configured to reduce a gas permeability of the cell substrate, or
at least one groove-shaped notch formed in an elongated shape along a gas flow direction in the cell substrate, the groove-shaped notch configured to adjust the gas permeability of the cell substrate.

2. The cell module for a solid oxide fuel cell according to claim 1, wherein an apparent volume of the cell substrate is configured to be lowered such that the gas permeability of the cell substrate is adjusted.

3. The cell module for a solid oxide fuel cell according to claim 1, wherein
the cell substrate comprises a porous material, and
a porosity of the porous material is configured to be lowered such that the gas permeability of the cell substrate is reduced.

4. The cell module for a solid oxide fuel cell according to claim 1, further comprising a gas penetration barrier member provided on at least a portion of the cell substrate such that the gas permeability of the cell substrate is reduced at the portion of the cell substrate on which the gas penetration member is provided.

5. The cell module for a solid oxide fuel cell according to claim 1, wherein within the cell substrate, a gas permeability of a portion having a low gas permeability is 30 to 50% lower than a gas permeability of other portions.

6. A solid oxide fuel cell comprising:
the cell module for a solid oxide fuel cell according to claim 1, and
interconnectors that sandwich the cell module for a solid oxide fuel cell.

7. The cell module for a solid oxide fuel cell according to claim 1, wherein
the cell module for a solid oxide fuel cell comprises the at least one dense portion formed by compressing the cell substrate, and
the at least one dense portion is formed in an elongated shape along the gas flow direction.

8. The cell module for a solid oxide fuel cell according to claim 1, wherein
the cell module for a solid oxide fuel cell comprises the at least one dense portion formed by compressing the cell substrate,
the at least one dense portion comprises a plurality of dense portions that are separated from one another by a distance therebetween.

9. The cell module for a solid oxide fuel cell according to claim 1, wherein
the cell module for a solid oxide fuel cell comprises the at least one dense portion formed by compressing the cell substrate, and
the at least one dense portion is formed in the central portion of the cell substrate.

10. The cell module for a solid oxide fuel cell according to claim 9, wherein
a thickness of the at least one dense portion formed in the central portion is less than a thickness of the inlet portion and a thickness of the outlet portion.

11. The cell module for a solid oxide fuel cell according to claim 1, wherein
the cell module for a solid oxide fuel cell comprises the at least one groove-shaped notch formed in the elongated shape along the gas flow direction in the cell substrate, and
the at least one groove-shaped notch is formed in a surface of the cell substrate opposite to a surface of the cell substrate on which the one electrode is formed.

12. The cell module for a solid oxide fuel cell according to claim 1, wherein
the cell module for a solid oxide fuel cell comprises the at least one groove-shaped notch formed in the elongated shape along the gas flow direction in the cell substrate,
the at least one groove-shaped notch comprises a plurality of groove-shaped notches formed in elongated shapes along the gas flow direction and separated from one another by a distance therebetween.

13. The cell module for a solid oxide fuel cell according to claim 1, wherein
the cell module for a solid oxide fuel cell comprises the at least one groove-shaped notch formed in the elongated shape along the gas flow direction in the cell substrate,
the at least one groove-shaped notch comprises a first groove-shaped notch formed in the inlet portion of the cell substrate, and a second groove-shaped notch formed in the outlet portion of the cell substrate.

* * * * *